(12) United States Patent
Smrtnik et al.

(10) Patent No.: US 12,545,282 B2
(45) Date of Patent: Feb. 10, 2026

(54) SYSTEMS AND METHODS FOR PROVIDING VEHICLE INTERVENTION THERAPY

(71) Applicant: GM GLOBAL TECHNOLOGY OPERATIONS LLC, Detroit, MI (US)

(72) Inventors: Samuel Smrtnik, Lake Orion, MI (US); Mark Lewkowicz, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 91 days.

(21) Appl. No.: 18/653,574

(22) Filed: May 2, 2024

(65) Prior Publication Data

US 2025/0340211 A1 Nov. 6, 2025

(51) Int. Cl.
*B60W 50/16* (2020.01)
*B60W 40/08* (2012.01)
*B60W 50/14* (2020.01)

(52) U.S. Cl.
CPC ............ *B60W 50/16* (2013.01); *B60W 40/08* (2013.01); *B60W 2040/0827* (2013.01); *B60W 2050/143* (2013.01); *B60W 2050/146* (2013.01); *B60W 2540/215* (2020.02); *B60W 2540/221* (2020.02); *B60W 2540/229* (2020.02)

(58) Field of Classification Search
CPC ................. B60W 50/16; B60W 40/08; B60W 2040/0827; B60W 2050/143; B60W 2050/146; B60W 2540/215; B60W 2540/221; B60W 2540/229
See application file for complete search history.

(56) References Cited

U.S. PATENT DOCUMENTS

| | | | |
|---|---|---|---|
| 11,427,207 B1 * | 8/2022 | Ethington | G06Q 50/40 |
| 2014/0172467 A1 * | 6/2014 | He | G06Q 40/08 705/4 |
| 2018/0312164 A1 * | 11/2018 | Sasabuchi | B60W 30/18018 |
| 2019/0332902 A1 * | 10/2019 | Gallagher | G06V 10/811 |
| 2021/0197667 A1 * | 7/2021 | Winton | B60K 35/80 |

* cited by examiner

*Primary Examiner* — Thomas S Mccormack
(74) *Attorney, Agent, or Firm* — Ingrassia Fisher & Lorenz, LLP | IF&L

(57) ABSTRACT

Systems and methods of providing vehicle intervention therapy is provided. First sensor data associated with the occupant of the vehicle is received from a sensor system. A first physiological parameter is generated based on the first sensor data. A physiological state is identified based on the first physiological parameter. The first physiological parameter is compared to a physiological parameter threshold. A first command is issued to a vehicle therapy system to implement intervention therapy associated with the physiological state to the occupant of the vehicle based on the comparison.

20 Claims, 4 Drawing Sheets

SYSTEMS AND METHODS FOR PROVIDING VEHICLE INTERVENTION THERAPY

INTRODUCTION

The technical field generally relates to vehicles, and more particularly relates to providing vehicle intervention therapy to an occupant of a vehicle.

In many instances occupants of vehicles experience various physiological states in response to stressful and/or difficult driving conditions. Examples of physiological states associated with challenging driving conditions include, but are not limited to, an anxious state and a decreased alertness state. Examples of occupants include drivers and passengers. The physiological state of a driver may impact the driver's ability to safely drive the vehicle. In some cases, a driver of a vehicle may pull over to rest. The driver may have difficulty falling asleep and/or resting. If the driver is unable to rest, the driver may be unable to safely manage a vehicle.

Accordingly, it is desirable to provide systems and methods for providing vehicle intervention therapy to an occupant of a vehicle. Other desirable features and characteristics will become apparent from the subsequent detailed description and the appended claims, taken in conjunction with the accompanying drawings and the foregoing technical field and background.

SUMMARY

A vehicle intervention therapy system includes a processor and a memory communicatively coupled to the processor. The memory includes instructions that upon execution by the processor, cause the processor to: receive first sensor data associated with an occupant of a vehicle from a sensor system; generate a first physiological parameter based on the first sensor data; identify a physiological state based on the first physiological parameter; compare the first physiological parameter to a physiological parameter threshold; and issue a first command to a vehicle therapy system to implement intervention therapy associated with the physiological state to the occupant of the vehicle based on the comparison.

In at least one embodiment, the memory further includes instructions that upon execution by the processor, cause the processor to: receive second sensor data associated with the occupant of the vehicle from the sensor system; generate a second physiological parameter based on the second sensor data; compare the second physiological parameter to the physiological parameter threshold; and issue a second command to the vehicle therapy system to discontinue implementation of the intervention therapy based on the comparison.

In at least one embodiment, the first sensor data includes occupant biometric data and the sensor system includes a biometric sensor system.

In at least one embodiment, the first sensor data includes vehicle environmental data and the sensor system includes a vehicle environment sensor system.

In at least one embodiment, the memory further includes instructions that upon execution by the processor, cause the processor to issue the first command to the vehicle therapy system to implement the intervention therapy to the occupant of the vehicle, wherein the vehicle therapy system is a vehicle vibrotactile therapy (VVT) system, and the intervention therapy is vibrotactile intervention therapy.

In at least one embodiment, the VVT system is integrated into at least one of a vehicle steering wheel and a vehicle seat.

In at least one embodiment, the memory further includes instructions that upon execution by the processor, cause the processor to issue the first command to the therapy system to implement the intervention therapy to the occupant of the vehicle, wherein the vehicle therapy system is an audio frequency therapy (AFT) system, and the intervention therapy is sound intervention therapy.

In at least one embodiment, the memory further includes instructions that upon execution by the processor, cause the processor to: upon an identification of the physiological state as an anxiety state, issue the first command to the AFT system to generate the sound intervention therapy using a first binaural beat between 8 Hz and 13 Hz; upon an identification of the physiological state as a decreased alertness state, issue the first command to the AFT system to generate the sound intervention therapy using a second binaural beat between 14 Hz and 30 Hz; and upon an identification of the physiological state as one of a sleep state and a meditation state, issue the first command to the AFT system to generate the sound intervention therapy using a third binaural beat between 1 Hz and 4 Hz.

In at least one embodiment, the AFT system is integrated into a vehicle headrest.

In at least one embodiment, the memory further includes instructions that upon execution by the processor, cause the processor to issue the first command to the AFT system to generate the sound intervention therapy using a binaural beat associated with the physiological state of the occupant.

In at least one embodiment, the memory further includes instructions that upon execution by the processor, cause the processor to receive an occupant selection of an audio carrier signal to carry the binaural beat.

In at least one embodiment, the memory further includes instructions that upon execution by the processor, cause the processor to identify the physiological state based on the first physiological parameter as one of an anxiety state, a decreased alertness state, a sleep state, and a meditation state.

In at least one embodiment, the memory further includes instructions that upon execution by the processor, cause the processor to: detect that operation of the vehicle has been initiated; generate an intervention therapy menu display including at least two intervention therapy options for display on a vehicle display device; receive a user selection of a first intervention therapy option from the at least two intervention therapy options; and issue the first command to the vehicle therapy system to implement the intervention therapy in accordance with the first intervention therapy option.

In at least one embodiment, the memory further includes instructions that upon execution by the processor, cause the processor to receive the first sensor data, the first sensor data comprising at least one of, the first sensor data comprising at least one of heart rate data, pulse rate data, eye movement data, traffic data, daylight data, horn sound data, adverse weather data, and speedometer data.

In at least one embodiment, the memory further includes instructions that upon execution by the processor, cause the processor to: generate a selectable therapy termination option for display on a vehicle display device; determine whether the therapy termination option has been selected; and issue a third command to the vehicle therapy system to discontinue implementation of the intervention therapy based on the determination.

In at least one embodiment, the memory further includes instructions that upon execution by the processor, cause the processor to: receive the first sensor data from the sensor system, wherein the first sensor data is first heart rate variability (HRV) data and the first sensor system is a least one heart rate sensor; generate the first physiological parameter based on the first HRV data, wherein the first physiological parameter is a first heart rate irregularity parameter; identify a physiological state based on the first heart rate irregularity parameter, wherein the physiological state is an anxious state; compare the first heart rate irregularity parameter to a physiological parameter threshold, wherein the physiological parameter threshold is a heart rate irregularity threshold; and issue the first command to the vehicle therapy system to implement the intervention therapy associated with the anxious state to the occupant of the vehicle based on the comparison.

In at least one embodiment, the memory further includes instructions that upon execution by the processor, cause the processor to: receive second HRV data from the at least one heart rate sensor; generate a second heart rate irregularity parameter based on the second HRV data; compare the second heart rate irregularity parameter to the heart rate irregularity threshold; and issue a fourth command to the vehicle therapy system to discontinue the implementation of the intervention therapy based on the comparison.

In at least one embodiment, the memory further includes instructions that upon execution by the processor, cause the processor to: determine whether the physiological parameter is greater than the physiological parameter threshold for a pre-defined period of time; and issue the first command to the vehicle therapy system to implement intervention therapy associated with the physiological state to the occupant of the vehicle based on the determination.

A method of providing vehicle intervention therapy to an occupant of a vehicle includes: receiving first sensor data associated with the occupant of the vehicle from a sensor system; generating a first physiological parameter based on the first sensor data; identifying a physiological state based on the first physiological parameter; comparing the first physiological parameter to a physiological parameter threshold; and issuing a first command to a vehicle therapy system to implement intervention therapy associated with the physiological state to the occupant of the vehicle based on the comparison.

A vehicle including a vehicle intervention therapy system includes a processor and a memory communicatively coupled to the processor. The memory includes instructions that upon execution by the processor, cause the processor to: receive first sensor data associated with an occupant of the vehicle from a sensor system; generate a first physiological parameter based on the first sensor data; identify a physiological state based on the first physiological parameter; compare the first physiological parameter to a physiological parameter threshold; and issue a first command to a vehicle therapy system to implement intervention therapy associated with the physiological state to the occupant of the vehicle based on the comparison.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, in and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
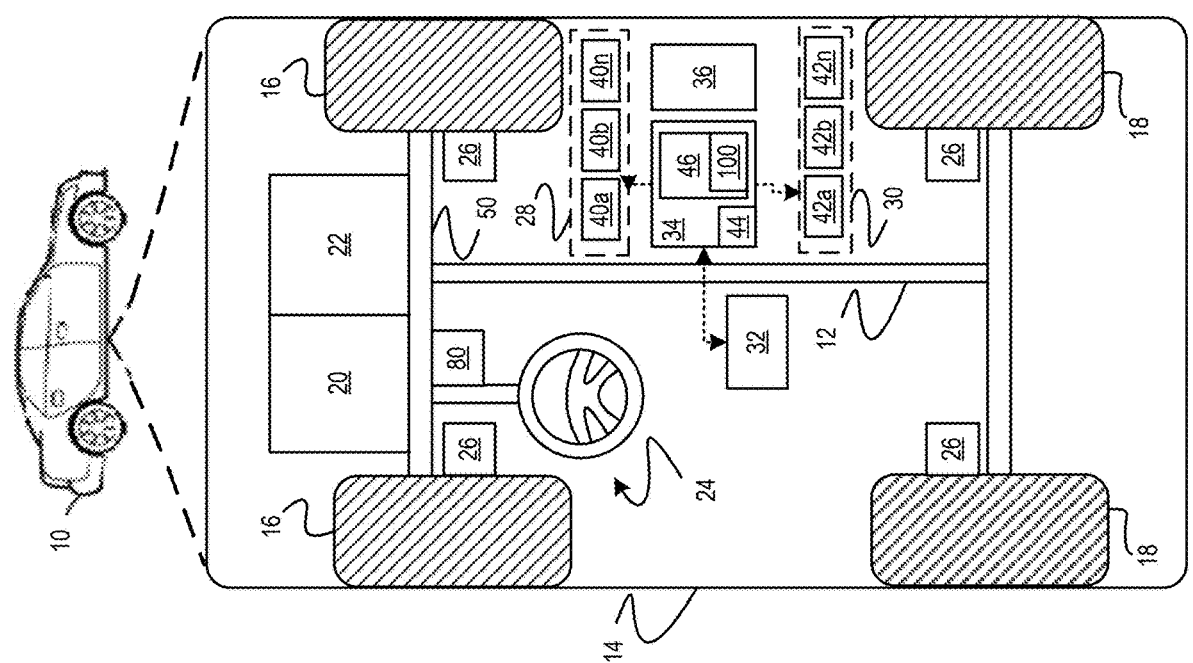
FIG. 1 is a functional block diagram of a vehicle including a vehicle intervention therapy system in accordance with at least one embodiment.

Referring to FIG. 1, a functional block diagram of a vehicle 10 including a vehicle intervention therapy system 100 in accordance with at least one embodiment is shown. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs).

In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another.

For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. In various embodiments, the sensor system 28 includes a biometric sensor system configured to sense occupant biometric data of one or more occupants of the vehicle 10. In various embodiments, the sensor system 28 includes a vehicle environment sensor system configured to sense vehicle environmental data.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices 42a-42n that control one or more vehicle features such as, but not limited to, the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2:
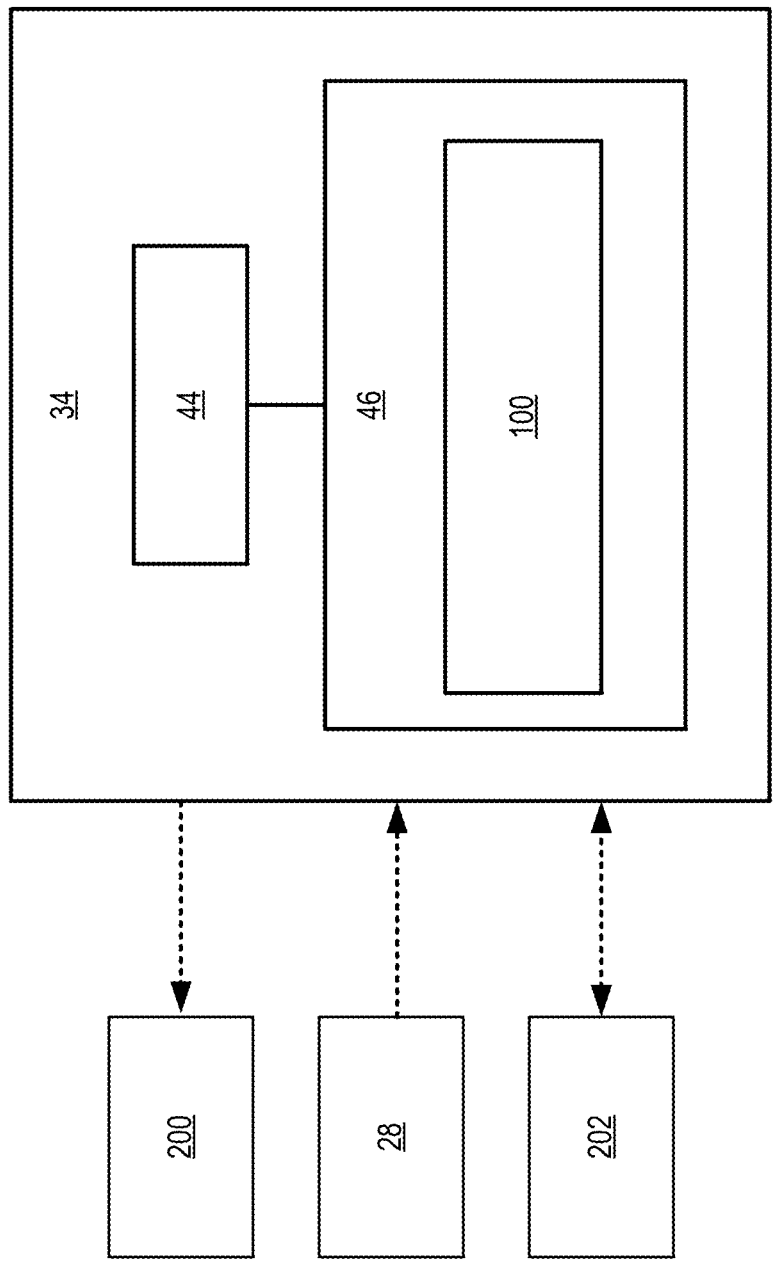
FIG. 2 is a functional block diagram of a controller including a vehicle intervention therapy system in accordance with at least one embodiment.

Referring to FIG. 2, a functional block diagram of a controller 34 including a vehicle intervention therapy system 100 in accordance with at least one embodiment is shown. The controller 34 includes at least one processor 44 and at least one memory 46. The at least one processor 44 is a programable device that includes one or more instructions stored in or associated with the at least one memory 46. The at least one memory 46 includes instructions that the at least one processor 44 is configured to execute. The at least one memory 46 includes an embodiment of the vehicle intervention therapy system 100. The controller 34 is configured to be communicatively coupled to a sensor system 28, a vehicle therapy system 200, and vehicle display device 202.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. In various embodiments, the sensor system 28 includes a biometric sensor system configured to sense occupant biometric data of one or more occupants of the vehicle 10. The biometric sensor system may include one or more of the sensing devices 40a-40n. Examples of sensing devices also include, but are not limited to, heart rate monitors, pulse rate monitors, and wearable devices. In various embodiments, the sensor system 28 includes a vehicle environment sensor system configured to sense vehicle environmental data. The vehicle environment sensor system may include one or more of the sensing devices 40a-40n.

In at least one embodiment, the vehicle therapy system 200 includes a vehicle vibrotactile therapy (VVT) system. The VVT system is configured to implement vibrotactile intervention therapy. In at least one embodiment the VVT system is integrated into a vehicle steering wheel. In at least one embodiment, the VVT system is integrated into one or more vehicle seats. In at least one embodiment the VVT system is integrated into the vehicle steering wheel and one or more vehicle seats.

In at least one embodiment, the vehicle therapy system 200 includes an audio frequency therapy (AFT) system. The AFT system is configured to implement sound intervention therapy. In at least one embodiment, the AFT system is integrated into a vehicle headrest. The AFT system includes speakers that are integrated into the vehicle headrest. The vibrotactile intervention therapy and the sound intervention therapy are two forms of intervention therapy. In at least one embodiment, the vehicle therapy system 200 includes a vehicle vibrotactile therapy (VVT) system and an audio frequency therapy (AFT) system.

The controller 34 may include additional components that facilitate operation of the vehicle intervention therapy system 100. The operation of the vehicle intervention therapy system 100 will be described in greater detail below.

Figure 3:
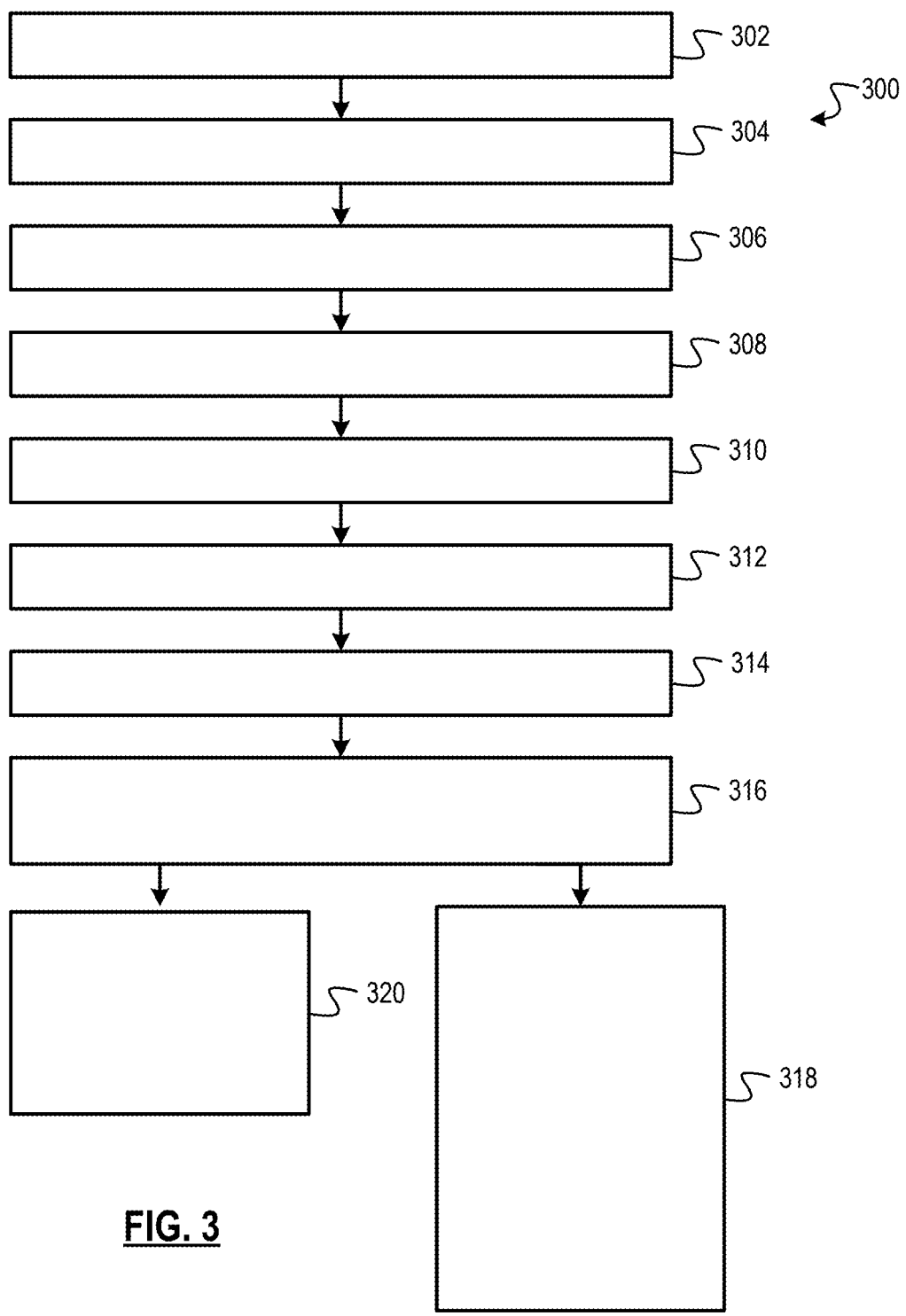
FIG. 3 is a flowchart representation of an exemplary method of providing vehicle intervention therapy to an occupant of a vehicle in accordance with at least one embodiment.

Referring to FIG. 3, a flowchart representation of an exemplary method 300 of providing vehicle intervention therapy to an occupant of a vehicle 10 in accordance with at least one embodiment is shown. The method 300 will be described with reference to an exemplary implementation of the vehicle intervention therapy system 100. As can be appreciated in light of the disclosure, the order of operation within the method 300 is not limited to the sequential execution as illustrated in FIG. 3 but may be performed in one or more varying orders as applicable and in accordance with the present disclosure.

At 302, the vehicle intervention therapy system 100 detects that an operation of the vehicle 10 has been initiated. For example, the vehicle intervention therapy system 100 may detect that the ignition system of the vehicle 10 has been turned on. At 304, the vehicle intervention therapy system 100 is responsively activated for operation. In at least one embodiment, the vehicle intervention therapy system 100 is configured to generate an intervention therapy menu for display on a vehicle display device 202 upon activation at 306. In various embodiments, the intervention therapy menu provides intervention therapy options for selection by a user. Examples of users include a driver of the vehicle 10 and a passenger of the vehicle 10. In at least one embodiment, the intervention therapy menu includes a vibrotactile intervention therapy option and a sound intervention therapy option as intervention therapy options that are available for selection by the user.

In at least one embodiment, if the user selects the vibrotactile intervention therapy option via the intervention therapy menu, vehicle intervention therapy system 100 is configured to generate options for the implementation of the vibrotactile intervention therapy by a vehicle vibrotactile therapy (VVT) system for display on the vehicle display device 202. In at least one embodiment, the VVT system integrated into a vehicle steering wheel and one or more vehicle seats. The displayed options for the implementation of the vibrotactile intervention therapy that are available for selection by the user includes the vehicle steering wheel and/or the vehicle seat occupied by the user. In various embodiments, the displayed options for the implementation of the vibrotactile intervention therapy that are available for selection by the user include one or more of different selectable vibration modes. Each selectable vibration mode may have a different vibration frequency, a different vibration intensity, and/or a different vibration pattern.

In at least one embodiment, if the user selects the sound intervention therapy option via the intervention therapy menu, the vehicle intervention therapy system 100 is configured to generate options for the implementation of the sound intervention therapy for display on the vehicle display device 202. The vehicle therapy system 200 used to implement the sound intervention therapy is an audio frequency therapy (AFT) system that is integrated into a vehicle headrest.

In at least one embodiment, the AFT system generates the sound intervention therapy using a binaural beat. An audio carrier signal is used to carry the binaural beat. In various embodiments, the displayed options for the implementation of the sound intervention therapy includes a list of audio carrier signals that are available for selection by the user. The list of audio carrier signals may, for example, include soothing sounds or songs. An example of a soothing sound is an ocean sound. In various embodiments, a user is provided with the option of providing an audio carrier signal. For example, the user may request that a user provided song be used as the audio carrier signal.

In at least one embodiment, the user is provided with the option of selecting both the vibrotactile intervention therapy option and the sound intervention therapy option. When a user selects both options the vibrotactile intervention therapy and the sound intervention therapy option, the vehicle intervention therapy system 100 is configured to issue a command to the vehicle therapy system 200 to implement intervention therapy associated with a physiological state of the user via both a vehicle vibrotactile therapy (VVT) system and an audio frequency therapy (AFT) system in unison, At 308, the vehicle intervention therapy system 100 receives the intervention therapy option selected by the user via the intervention therapy menu. In various embodiments, the vehicle intervention therapy system 100 receives the additional options selected by the user that are associated with the selected intervention therapy.

At 310, the vehicle intervention therapy system 100 receives sensor data from the sensor system 28. In various embodiments, the sensor system 28 includes a biometric sensor system and the sensor data is occupant biometric data. Examples of occupant biometric data include, but are not limited to, heart rate data, pulse rate data, and eye movement data. In various embodiments, the sensor system 28 includes a vehicle environment sensor system and the sensor data includes vehicle environment data. Examples of vehicle environment data include, but are not limited to, traffic data, daylight data, horn sound data, adverse event data, and speedometer data.

In at least one embodiment, the sensor data is compared to an associated sensor data threshold. When it is desirable that the sensor data be below the associated sensor data threshold, and the sensor data is above the associated sensor data threshold, the vehicle intervention therapy system 100 is responsively triggered from an idle mode into operation. When it is desirable that the sensor data be above the associated sensor data threshold, and the sensor data is below the associated sensor data threshold, the vehicle intervention therapy system 100 is responsively triggered from an idle mode into operation.

In at least one embodiment, the type of sensor data that triggered the vehicle intervention therapy system 100 into operation is used to identify the appropriate vibration mode to use to implement vibrotactile intervention therapy. For example, if sensor data that triggered the vehicle intervention therapy system 100 into operation coincides with a decreased alertness state, the vehicle intervention therapy system 100 may select a vibration mode that generates a vibration intensity that is sufficiently high to increase the alertness state of the user.

In at least one embodiment, the type of sensor data that triggered the vehicle intervention therapy system 100 into operation is used to identify the appropriate binaural beat to use to implement sound intervention therapy. For example, if sensor data that triggered the vehicle intervention therapy system 100 into operation coincides with an anxious state, the vehicle intervention therapy system 100 may select a binaural beat that ranges from 8 Hz to 13 Hz. A binaural beat that falls within that frequency range is typically used to address an anxious state.

At 312, the vehicle intervention therapy system 100 generates a physiological parameter based on the received sensor data. For example, if the received sensor data is heart rate data, the generated physiological parameter may be a heart rate irregularity parameter. If the received sensor data is pulse rate data, the generated physiological parameter may be a rapid respiration rate parameter. If the received sensor data is daylight data, the generated physiological parameter may be a visibility parameter. If the received sensor data is eye movement data, the generated physiological parameter may be an alertness related parameter.

At 314, the vehicle intervention therapy system 100 identifies a physiological state of the occupant based on the physiological parameter. Examples of physiological states include, but are not limited to, an anxiety state, a decreased alertness state, a sleep state, and a meditation state. For example, if the physiological parameter is a heart rate irregularity parameter, the physiological state may be an anxious state. If the physiological parameter is rapid respiration rate, the physiological state may be an anxious state. If the speedometer data indicates that the speed of the vehicle is greater than zero and the physiological parameter is an alertness related parameter, the physiological state may be a decreased alertness state. If the physiological parameter is a visibility parameter, the physiological state may be a decreased alertness state. If the speedometer data indicates that the speed of the vehicle is zero and the physiological parameter is an alertness related parameter, the physiological state may be one of a sleep state or a meditation state.

At 316, the vehicle intervention therapy system 100 compares the physiological parameter to a physiological parameter threshold. In various embodiments, a default physiological parameter threshold is used for all users. In various embodiments, the vehicle intervention therapy system 100 is configured to compare the physiological parameter to a user-specific physiological parameter threshold. In at least one embodiment, the vehicle intervention therapy system 100 is configured to perform a user-specific physiological parameter threshold identification process. In various embodiments, during an initialization phase, the vehicle intervention therapy system 100 is configured to receive biometric data associated with a user via the sensor system 28 and use the received biometric data associated with the user to generate one or more user-specific physiological parameter thresholds. For example, the vehicle intervention therapy system 100 may generate a user-specific heart rate irregularity threshold based on heart rate data received from that user via the sensor system 28. For example, the vehicle intervention therapy system 100 may generate a user-specific rapid respiration rate threshold based on pulse rate data received from that user via the sensor system 28.

At 318, the vehicle intervention therapy system 100 issues a command to the vehicle therapy system 200 to implement intervention therapy associated with the physiological state if the physiological parameter does not compare favorably with the physiological parameter threshold. When it is desirable that the physiological parameter be below the associated physiological parameter threshold, and the physiological parameter is above the associated physiological parameter threshold, the vehicle intervention therapy system 100 issues a command to the vehicle therapy system 200 to implement intervention therapy associated with the identified physiological state. When it is desirable that the physiological parameter be above the associated physiological parameter threshold, and the physiological parameter is below the associated physiological parameter threshold, the vehicle intervention therapy system 100 issues a command to the vehicle therapy system 200 to implement the intervention therapy associated with the identified physiological state of the user. At 320, if the vehicle intervention system 100 determines that the physiological parameter does compare favorably with the physiological parameter threshold, the method returns to 310.

In various embodiments, if the vehicle intervention therapy system 100 determines that the physiological parameter compares unfavorably with the physiological parameter threshold for a predefined period of time, the vehicle intervention therapy system 100 issues the command to the vehicle therapy system 200 to implement the intervention therapy associated with the identified physiological state of the user. If the vehicle intervention therapy system 100 determines that the physiological parameter compares unfavorably with the physiological parameter threshold for less than the predefined period of time, the method returns to 310.

For example, if the received sensor data is heart rate data and the generated physiological parameter is a heart rate irregularity parameter. The heart rate irregularity parameter is compared to a heart rate irregularity threshold. If the heart rate irregularity parameter is greater than the heart rate irregularity threshold and remains higher than the heart rate irregularity threshold for a predefined period of time, the vehicle intervention therapy system 100 is configured to issue a command to the vehicle therapy system 200 to implement intervention therapy associated with an anxious state. In various embodiments, the heart rate data may be heart rate variability data.

For example, if the received sensor data is pulse rate data and the generated physiological parameter is a rapid respiration rate parameter. The rapid respiration rate parameter is compared to a rapid respiration rate threshold. If the rapid respiration rate parameter is greater than rapid respiration rate parameter threshold and remains higher than the rapid respiration rate parameter threshold for a predefined period of time, the vehicle intervention therapy system 100 is configured to issue a command to the vehicle therapy system 200 to implement intervention therapy associated with an anxious state.

For example, if the received sensor data is daylight data, the generated physiological parameter may be a visibility parameter. The visibility parameter is compared to a visibility threshold. If the visibility parameter is lower than the visibility threshold and remains lower than the visibility threshold for a predefined period of time, the vehicle intervention therapy system 100 is configured to issue a command to the vehicle therapy system 200 to implement intervention therapy associated with a decreased alertness state.

If the user selected therapy option is vibrotactile intervention therapy, the vehicle intervention therapy system 100 issues the command to the VVT system to implement vibrotactile intervention therapy. The vibrotactile intervention therapy is implemented in accordance with the associated user selections.

If the user selected therapy option is sound intervention therapy, the vehicle intervention therapy system 100 issues the command to the AFT system to implement sound intervention therapy in accordance with associated user selections. In at least one embodiment, the AFT system generates the sound intervention therapy using a binaural beat associated with the identified physiological state of the occupant.

In various embodiments, the vehicle headrest includes two speaker systems. Each speaker system is configured to generate sound intervention therapy for each car of the user. The AFT system implements the sound intervention therapy using the binaural beat by generating a first frequency via one of the speaker systems and a second frequency via the other one of the speaker systems. The first frequency is different from the second frequency. Both the first and second frequencies of the binaural beat are carried by the same audio carrier signal.

In at least one embodiment, upon an identification of the physiological state of the occupant as an anxiety state, the vehicle intervention therapy system 100 is configured to issue a command to the AFT system to generate the sound intervention therapy using a binaural beat between 8 Hz and 13 Hz. In at least one embodiment, upon an identification of the physiological state of the occupant as a decreased alertness state, the vehicle intervention therapy system 100 is configured to issue a command to the AFT system to generate the sound intervention therapy using a binaural beat between 14 Hz and 30 Hz. In at least one embodiment, upon an identification of the physiological state of the occupant as a sleep state or a meditation state, the vehicle intervention therapy system 100 is configured to issue a command to the AFT system to generate the sound intervention therapy using a binaural beat between 1 Hz and 4 Hz.

In at least one embodiment, vehicle intervention therapy system 100 is configured to issue a command to the AFT system to generate the sound intervention therapy using the occupant selected audio carrier signal to carry the binaural beat. In at least one embodiment, vehicle intervention therapy system 100 is configured to use a default audio carrier signal to carry the binaural beat. An example of a default audio carrier signal may be soothing music.

In various embodiments, the vehicle intervention therapy system 100 is configured to generate a selectable therapy termination option for display on the vehicle display device 202. The vehicle intervention therapy system 100 is configured to determine whether the therapy termination option has been selected. If the vehicle intervention therapy system 100 determines that the therapy termination option has been selected, the vehicle intervention therapy system 100 is configured to issue a command to the vehicle therapy system 200 to discontinue implementation of the intervention therapy.

If at 320 the method 300 returns to 310. The vehicle intervention therapy system 100 receives updated sensor data associated with the occupant of the vehicle 10 from the sensor system 28. The vehicle intervention therapy system 100 generates an updated physiological parameter based on the updated sensor data. The vehicle intervention therapy system 100 compares the updated physiological parameter to the physiological parameter threshold. If the updated physiological parameter is less than the associated physiological parameter threshold, when a lower value of the physiological parameter is desirable, the vehicle intervention therapy system 100 issues a command to the vehicle therapy system 200 to discontinue implementation of the intervention therapy. If the updated physiological parameter is greater than the physiological parameter threshold, when a higher value of the physiological parameter is desirable, the vehicle intervention therapy system 100 issues a command to the vehicle therapy system 200 to discontinue implementation of the intervention therapy.

Figure 4:
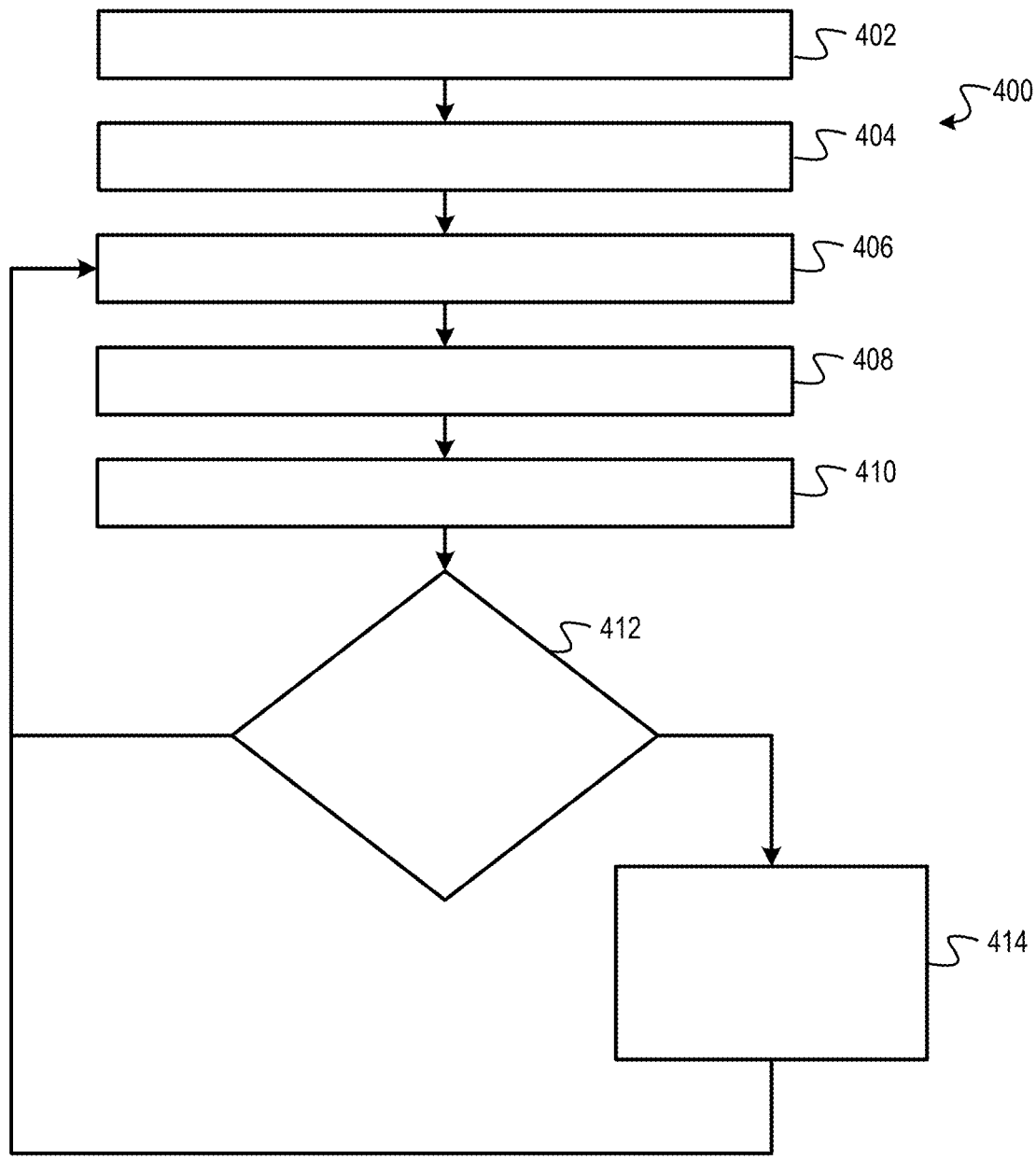
FIG. 4 is a flowchart representation of an exemplary method of providing vehicle intervention therapy to an occupant of a vehicle experiencing an anxious state in accordance with at least one embodiment.

FIG. 4 is a flowchart representation of an exemplary method 400 of providing vehicle intervention therapy to an occupant of a vehicle 10 experiencing an anxious state in accordance with at least one embodiment. The method 400 will be described with reference to an exemplary implementation of the vehicle intervention therapy system 100. As can be appreciated in light of the disclosure, the order of operation within the method 400 is not limited to the sequential execution as illustrated in FIG. 4 but may be performed in one or more varying orders as applicable and in accordance with the present disclosure.

At 402, the vehicle intervention therapy system 100 detects that an operation of the vehicle 10 has been initiated. For example, the vehicle intervention therapy system 100 may detect that the ignition system of the vehicle 10 has been turned on. At 404, the vehicle intervention therapy system 100 is activated for operation. The sensor system 28 of the vehicle 10 includes at least one heart rate sensor. At 406, the vehicle intervention therapy system 100 receives heart rate data from the at least one heart rate sensor. The heart rate data is heart rate variability (HRV) data. At 408, the vehicle intervention therapy system 100 generates a heart rate irregularity parameter based on the HRV data. At 410, the vehicle intervention therapy system 100 identifies the physiological state of the occupant as an anxious state based on the heart rate irregularity parameter. At 412, the vehicle intervention therapy system 100 determines whether the heart rate irregularity parameter is greater than a heart rate irregularity threshold. In various embodiments, the vehicle intervention therapy system 100 determines whether the heart rate irregularity parameter is greater than the heart rate irregularity threshold for a predefined period of time.

If vehicle intervention therapy system 100 determines that the heart rate irregularity parameter is greater than a heart rate irregularity threshold, at 414, the vehicle intervention therapy system 100 issues a command to the vehicle therapy system 200 to implement intervention therapy in accordance with user selected intervention therapy options. In various embodiments, if the vehicle intervention therapy system 100 determines that the heart rate irregularity parameter is greater than a heart rate irregularity threshold for a predefined period of time, the vehicle intervention therapy system 100 issues a command to the vehicle therapy system 200 to implement intervention therapy in accordance with user selected intervention therapy options.

If vehicle intervention therapy system 100 determines that the heart rate irregularity parameter is less than a heart rate irregularity threshold, the method 400 returns to 406. In various embodiments, if the vehicle intervention therapy system 100 determines that the heart rate irregularity parameter is less than a heart rate irregularity threshold for less that the predefined period of time, the method 400 returns to 406.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle intervention therapy system comprising:
a processor; and
a memory communicatively coupled to the processor, the memory comprising instructions that upon execution by the processor, cause the processor to:
receive first sensor data associated with an occupant of a vehicle from a sensor system;
generate a first physiological parameter based on the first sensor data;
identify a physiological state based on the first physiological parameter;
compare the first physiological parameter to a physiological parameter threshold;
issue a first command to a vehicle therapy system to implement intervention therapy associated with the physiological state to the occupant of the vehicle based on the comparison of the first physiological parameter to the physiological parameter threshold;
receive second sensor data associated with the occupant of the vehicle from the sensor system;
generate a second physiological parameter based on the second sensor data;
compare the second physiological parameter to the physiological parameter threshold; and
issue a second command to the vehicle therapy system to discontinue implementation of the intervention therapy based on the comparison of the second physiological parameter to the physiological parameter threshold.

2. The system of claim 1, wherein the first sensor data comprises occupant biometric data and the sensor system comprises a biometric sensor system.

3. The system of claim 1, wherein the first sensor data comprises vehicle environmental data and the sensor system comprises a vehicle environment sensor system.

4. The system of claim 1, wherein the memory further comprises instructions that upon execution by the processor, cause the processor to issue the first command to the vehicle therapy system to implement the intervention therapy to the occupant of the vehicle, wherein the vehicle therapy system is a vehicle vibrotactile therapy (VVT) system, and the intervention therapy is vibrotactile intervention therapy.

5. The system of claim 4, wherein the VVT system is integrated into at least one of a vehicle steering wheel and a vehicle seat.

6. The system of claim 1, wherein the memory further comprises instructions that upon execution by the processor, cause the processor to issue the first command to the therapy system to implement the intervention therapy to the occupant of the vehicle, wherein the vehicle therapy system is an audio frequency therapy (AFT) system, and the intervention therapy is sound intervention therapy.

7. The system of claim 6 wherein the memory further comprises instructions that upon execution by the processor, cause the processor to:
upon an identification of the physiological state as an anxiety state, issue the first command to the AFT system to generate the sound intervention therapy using a first binaural beat between 8 Hz and 13 Hz;
upon an identification of the physiological state as a decreased alertness state, issue the first command to the AFT system to generate the sound intervention therapy using a second binaural beat between 14 Hz and 30 Hz; and
upon an identification of the physiological state as one of a sleep state and a meditation state, issue the first command to the AFT system to generate the sound intervention therapy using a third binaural beat between 1 Hz and 4 Hz.

8. The system of claim 6, wherein the AFT system is integrated into a vehicle headrest.

9. The system of claim 6, wherein the memory further comprises instructions that upon execution by the processor, cause the processor to issue the first command to the AFT system to generate the sound intervention therapy using a binaural beat associated with the physiological state of the occupant.

10. The system of claim 9, wherein the memory further comprises instructions that upon execution by the processor, cause the processor to receive an occupant selection of an audio carrier signal to carry the binaural beat.

11. The system of claim 1, wherein the memory further comprises instructions that upon execution by the processor, cause the processor to identify the physiological state based on the first physiological parameter as one of an anxiety state, a decreased alertness state, a sleep state, and a meditation state.

12. The system of claim 1, wherein the memory further comprises instructions that upon execution by the processor, cause the processor to:
detect that operation of the vehicle has been initiated;
generate an intervention therapy menu display including at least two intervention therapy options for display on a vehicle display device;
receive a user selection of a first intervention therapy option from the at least two intervention therapy options; and
issue the first command to the vehicle therapy system to implement the intervention therapy in accordance with the first intervention therapy option.

13. The system of claim 1, wherein the memory further comprises instructions that upon execution by the processor, cause the processor to receive the first sensor data, the first sensor data comprising at least one of heart rate data, pulse rate data, eye movement data, traffic data, daylight data, horn sound data, adverse weather data, and speedometer data.

14. The system of claim 1, wherein the memory further comprises instructions that upon execution by the processor, cause the processor to:
generate a selectable therapy termination option for display on a vehicle display device;
determine whether the therapy termination option has been selected; and
issue a third command to the vehicle therapy system to discontinue implementation of the intervention therapy based on the determination.

15. The system of claim 1, wherein the memory further comprises instructions that upon execution by the processor, cause the processor to:
receive the first sensor data from the sensor system, wherein the first sensor data comprises first heart rate variability (HRV) data and the sensor system comprises a least one heart rate sensor;
generate the first physiological parameter based on the first HRV data, wherein the first physiological parameter comprises a first heart rate irregularity parameter;
identify the physiological state based on the first heart rate irregularity parameter, wherein the physiological state comprises an anxious state;
compare the first heart rate irregularity parameter to the physiological parameter threshold, wherein the physiological parameter threshold comprises a heart rate irregularity threshold; and
issue the first command to the vehicle therapy system to implement the intervention therapy associated with the anxious state to the occupant of the vehicle based on the comparison.

16. The system of claim 15, wherein the memory further comprises instructions that upon execution by the processor, cause the processor to:
receive second HRV data from the at least one heart rate sensor;
generate a second heart rate irregularity parameter based on the second HRV data;
compare the second heart rate irregularity parameter to the heart rate irregularity threshold; and
issue a fourth command to the vehicle therapy system to discontinue the implementation of the intervention therapy based on the comparison.

17. The system of claim 1, wherein the memory further comprises instructions that upon execution by the processor, cause the processor to:
determine whether the physiological parameter is greater than the physiological parameter threshold for a predefined period of time; and
issue the first command to the vehicle therapy system to implement intervention therapy associated with the physiological state to the occupant of the vehicle based on the determination.

18. A method of providing vehicle intervention therapy to an occupant of a vehicle comprising:
receiving first sensor data associated with the occupant of the vehicle from a sensor system;
generating a first physiological parameter based on the first sensor data;
identifying a physiological state based on the first physiological parameter;
comparing the first physiological parameter to a physiological parameter threshold;
issuing a first command to a vehicle therapy system to implement intervention therapy associated with the physiological state to the occupant of the vehicle based on the comparison of the first physiological parameter to the physiological parameter threshold;
receiving second sensor data associated with the occupant of the vehicle from the sensor system;
generating a second physiological parameter based on the second sensor data;
comparing the second physiological parameter to the physiological parameter threshold; and
issuing a second command to the vehicle therapy system to discontinue implementation of the intervention therapy based on the comparison of the second physiological parameter to the physiological parameter threshold.

19. A vehicle including a vehicle intervention therapy system comprising:
a processor; and
a memory communicatively coupled to the processor, the memory comprising instructions that upon execution by the processor, cause the processor to:
receive first sensor data associated with an occupant of the vehicle from a sensor system;
generate a first physiological parameter based on the first sensor data;
identify a physiological state based on the first physiological parameter;
compare the first physiological parameter to a physiological parameter threshold;

issue a first command to a vehicle therapy system to implement intervention therapy associated with the physiological state to the occupant of the vehicle based on the comparison of the first physiological parameter to the physiological parameter threshold;

receive second sensor data associated with the occupant of the vehicle from the sensor system;

generate a second physiological parameter based on the second sensor data;

compare the second physiological parameter to the physiological parameter threshold; and issue a second command to the vehicle therapy system to discontinue implementation of the intervention therapy based on the comparison of the second physiological parameter to the physiological parameter threshold.

20. The vehicle of claim 19, wherein the memory further comprises instructions that upon execution by the processor, cause the processor to issue the first command to the vehicle therapy system to implement the intervention therapy to the occupant of the vehicle, wherein the vehicle therapy system is a vehicle vibrotactile therapy (VVT) system, and the intervention therapy is vibrotactile intervention therapy.

* * * * *